Feb. 6, 1951 W. R. KOCH 2,540,532

SUPERHETERODYNE RECEIVER WITH COMPENSATION FOR MISTUNING CAUSED BY AUTOMATIC VOLUME CONTROL

Filed Dec. 18, 1945 2 Sheets-Sheet 1

INVENTOR
WINFIELD R. KOCH.
BY H. G. Grover
ATTORNEY

Feb. 6, 1951 W. R. KOCH 2,540,532

SUPERHETERODYNE RECEIVER WITH COMPENSATION FOR MISTUNING CAUSED BY AUTOMATIC VOLUME CONTROL

Filed Dec. 18, 1945 2 Sheets-Sheet 2

INVENTOR
WINFIELD R. KOCH.
BY H. G. Grover
ATTORNEY

Patented Feb. 6, 1951 2,540,532

UNITED STATES PATENT OFFICE 2,540,532

SUPERHETERODYNE RECEIVER WITH COMPENSATION FOR MISTUNING CAUSED BY AUTOMATIC VOLUME CONTROL

Winfield R. Koch, Haddonfield, N. J., assignor to Radio Corporation of America, a corporation of Delaware Application December 18, 1945, Serial No. 635,794

7 Claims. (Cl. 250—20)

My present invention relates generally to automatic signal responsive control circuits for frequency modulated (FM) carrier wave receivers. My invention more particularly relates to FM receivers of the superheterodyne type employing automatic volume control (AVC) at a relatively high radio frequency operation range over which amplifier tube input capacities vary with change of control grid bias. Since it is difficult to eliminate the effect of variation in amplifier tube input capacities caused by change in AVC bias, I prefer to permit the variation of input capacities to occur while providing means for compensating for the variation.

It is, accordingly, one of the main objects of my present invention to provide a novel method of automatically compensating for detuning resulting from variation of tube input capacities caused by AVC of the gain of high carrier frequency amplifiers.

In accordance with one aspect of my present invention, selective high frequency amplifiers are provided with an over-all band-pass frequency response characteristic, and the center or mean frequency of signal-modulated carrier energy supplied to the amplifiers is automatically maintained in mid-band position despite changes in the resonant frequencies of the selective amplifiers.

In accordance with a second aspect of my present invention the pass-band of a selective high frequency amplifier is varied in width in response to the variation in intensity of received signals, while concurrently causing the signal-modulated energy applied to the amplifier to have a center frequency accommodated to the mid-band frequency of the pass-band of the amplifier.

Another important object of this invention is to provide in a superheterodyne receiver of the frequency modulation (FM) type equipped with AVC, a circuit responsive to variations in AVC bias magnitude for varying the local oscillator frequency in a sense such as to maintain the intermediate frequency (I. F.) signal energy accurately centered with the frequency response of the I. F. amplifier.

Still other objects of my invention are to improve generally the operation of FM receivers provided with AVC circuits, and more specifically to provide an efficient and economical system for compensating for selectivity changes in such receivers.

Other objects and advantages of my invention will best be understood by reference to the following description, taken in connection with the drawing, in which I have indicated diagrammatically two circuit organizations whereby my invention may be carried into effect.

Figure 1:
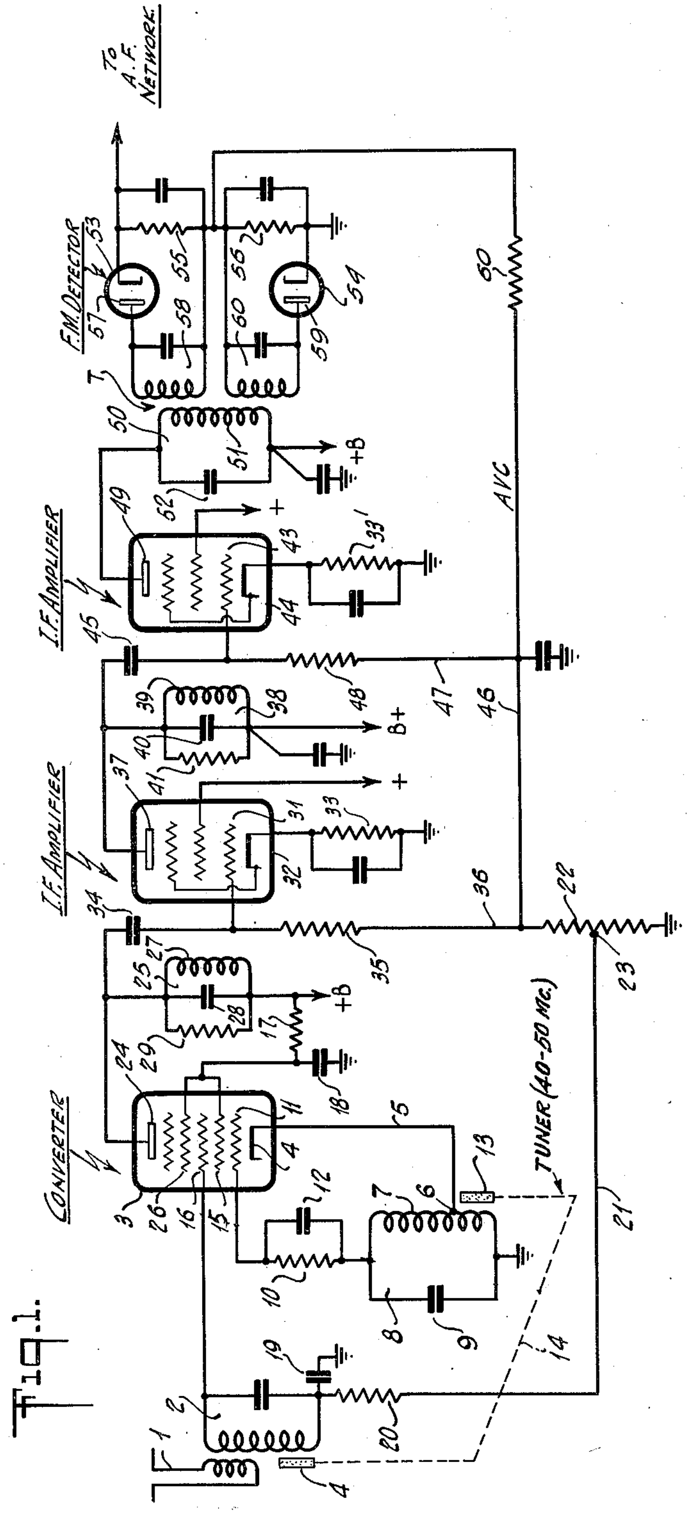
Fig. 1 shows an FM receiver embodying one form of the invention.
Figure 3:
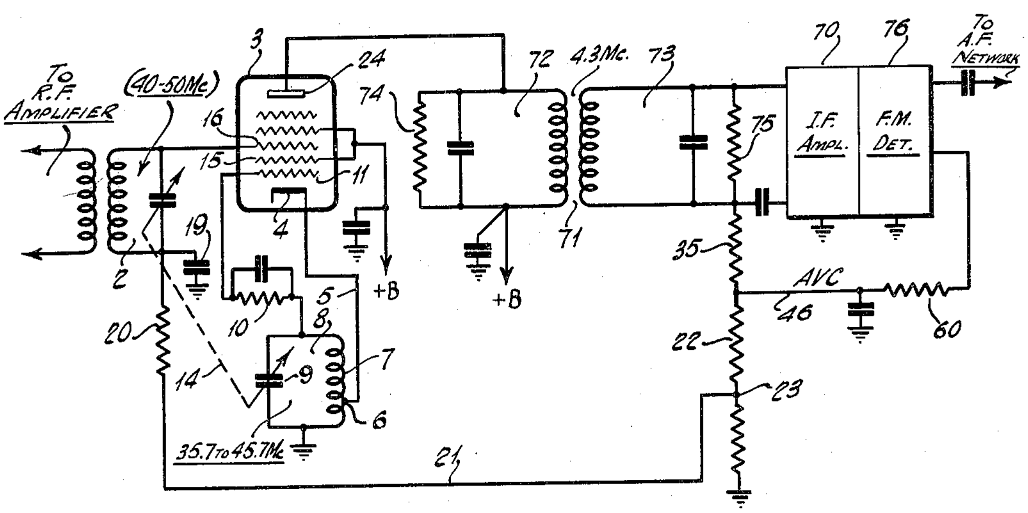
Fig. 3 is a partially schematic circuit diagram of a modification of the invention.

Referring now to the accompanying drawing, wherein like reference characters in the several figures denote similar circuit elements, it is to be understood that the systems of Figs. 1 and 3 are not restricted to FM reception, but may be used for phase modulation reception. In general, the term "angle modulated" used hereinafter denotes generically FM, phase modulation, or hybrid modulation having characteristics common to both. Further, my invention is applicable to amplitude modulated carrier waves, since the problems sought to be solved relate to the effect of AVC on controlled amplifier input capacity. The problems are pronounced at the high frequency ranges, as for example 40 to 50 megacycles (mc.) or above. However, even at lower radio frequencies, as in the 550 to 1700 kilocycle (kc.) band, similar problems are encountered. While I have assumed a superheterodyne receiver employing an AVC circuit, and adapted to receive FM signals in the 40 to 50 mc. range, it is to be understood that other operating frequency ranges may be employed, such as the 88 to 108 mc. hand recently assigned to FM radio broadcasting. The operating intermediate frequency (I. F.) is assumed as 4.3 mc. for the 40 to 50 mc. range, but a higher I. F. value, say 10.7 mc., is preferred for the 88 to 108 mc. range.

In both systems of Figs. 1 and 3 the AVC bias is applied to the converter tube signal grid for the purpose of effecting a compensating adjustment of local oscillator frequency. The direction, or sense, of oscillator frequency adjustment is such as to center or align the I. F. value with the effective mid-band frequency of the I. F. channel. In the system of Fig. 1 the AVC circuit causes the I. F. resonance curve to shift in frequency, while the aforesaid adjustment of local oscillator frequency causes the I. F. signal energy to have a center frequency falling at the mid-frequency of the I. F. resonance curve. In the system of Fig. 3, however, the action is in the nature of automatic selectivity control, wherein the I. F. band width varies directly with carrier amplitude. In such case the aforesaid adjustment of local oscillator frequency causes the I. F. signal energy to have a center frequency located at the effective mid-frequency of the I. F. band. These aforesaid functions are provided by circuits now to be described in detail.

Referring first to Fig. 1, the signal collector 1, while shown as a dipole, may be of any suitable construction. The resonant input circuit 2 of the converter tube 3 is coupled to the signal collector. The frequency of selective input circuit 2 may be varied by adjusting either the inductance or capacity of the circuit, but I have schematically represented the input coil as being varied in inductance value by an adjustable iron core in a known manner. It is to be understood that the signal collector 1 need not be magnetically coupled to coil 3 as shown, since one or more stages of selective radio frequency amplification may be utilized in cascade between collector 1 and selective input circuit 2. The converter tube 3 is of the pentagrid converter type, and the pentagrid tube may be of any desired construction. The converter tube 3 generally comprises a cathode 4 which is connected by lead 5 to a suitable point 6 on the coil 7 of oscillator tank circuit 8. Coil 7 is shunted by condenser 9, and the low potential side of the tank circuit 8 is grounded. The high potential side of the tank circuit is connected by the grid resistor 10 to the oscillation grid 11, the condenser 12 shunting resistor 10.

Coil 7 is adjustable in inductance value by virtue of the adjustable iron core 13. The numeral 14 schematically denotes any suitable mechanical coupling arrangement for jointly varying the positions of cores 13 and 4 thereby to provide concurrent adjustment of the frequencies of signal selector circuit 2 and the oscillator tank circuit 8. If the frequency range of selector circuit 2 covers a signal frequency range of 40 to 50 mc., then the frequency range of tank circuit 8 will be located at a frequency spacing from the signal range such that the operating I. F. value will be 4.3 mc. Of course, these above frequency values are all purely illustrative. Furthermore, those skilled in the art are fully acquainted with the manner of constructing a converter stage.

The oscillator anode electrode is provided by the grid 15 which is located between the oscillation grid 11 and the signal input grid 16. The oscillator anode electrode 15 is connected to the +B terminal of the direct current source through a voltage reducing resistor 17. The condenser 18 connects the electrode 15 to the grounded side of the tank circuit 8 for oscillatory currents. I prefer to generate local oscillations in a frequency range which is below the signal frequency range. If the signal frequency range of circuit 2 is 40 to 50 mc., then the tank circuit frequency range would be 35.7 to 45.7 mc.

Figure 2:
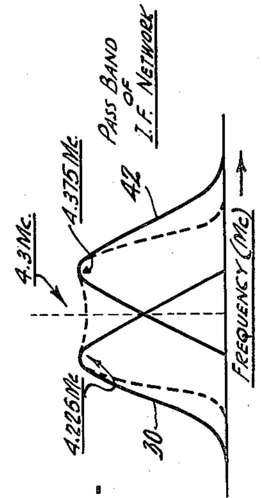
Fig. 2 is a graphic representation of the selectivity characteristics of the I. F. amplifiers.

The signal grid 16 is connected to the high potential side of the signal input circuit 2, and condenser 19 connects the low potential side of the input circuit 2 to ground for alternating currents. The low potential side of input circuit 2 is, furthermore, returned to ground for direct currents by means of a path which includes an alternating current filter resistor 20, lead 21 and the lower section of resistor 22. The lead 21 is connected to a predetermined intermediate tap 23 on the resistor 22. The plate 24 of tube 3 is connected to the high potential side of resonant I. F. circuit 25. The screen 26 is connected to the +B terminal through resistor 17. The output circuit 25 is a parallel resonant circuit, and consists of the coil 27 shunted by condenser 28. Resistor 29 shunts the tuned circuit 25, and provides a suitable amount of damping for the circuit. In accordance with my invention, circuit 25 is tuned to a frequency which is spaced from a center or reference frequency of 4.3 mc. by a predetermined frequency value. For example, Fig. 2 shows the resonance curve 30 of circuit 25 to be a single peak curve with a peak frequency at 4.225 mc. The peak frequency of the resonance curve 30 is accordingly 75 kc. below the operating I. F. value of 4.3 mc.

The I. F. signal voltage developed across circuit 25 is applied to the signal input grid 31 of the I. F. amplifier tube 32. The latter is shown as a pentode type of tube, but it is to be understood that any other suitable type of tube may be used. The cathode of the tube 32 is connected to ground through a suitable bypassed biasing resistor 33, while the signal grid 31 is coupled to the plate side of circuit 25 through the I. F. coupling condenser 34. The grid 31 is returned to the upper end of resistor 22 through the alternating current filter resistor 35 and lead 36. The plate 37 of amplifier tube 32 is connected to the high potential side of a second selective I. F. network 38, which is a parallel resonant circuit consisting of coil 39 shunted by each of a condenser 40 and a damping resistor 41. The low potential side of the resonant circuit 38 is connected to the +B terminal, and is, also, bypassed to ground for I. F. currents by a suitable condenser.

Circuit 38 has its resonance curve represented by the curve 42 of Fig. 2. It will be noted that the peak frequency of resonance curve 42 is located at 4.375 mc. In other words, circuit 38 has a peak frequency of +75 kc. above the operating I. F. value of 4.3 mc.

The high potential side of circuit 38 is coupled through the coupling condenser 45 to the signal input grid 43 of the following I. F. amplifier tube 44. The signal grid 43 is connected to the AVC lead 46 by a direct current voltage connection 47 which includes the alternating current filter resistor 48. It is pointed out that the upper end of resistor 22 is connected to the AVC lead 46. Tube 44, as in the case of tube 32, may be of the pentode type or any other suitable type of I. F. amplifier tube. The cathode of the tube is connected to ground through the bypassed biasing resistor 33′, while the plate 49 of tube 44 is connected to the high potential side of the resonant I. F. output circuit 50. The resonant output circuit 50 consists of the primary coil 51 of the discriminator transformer T, shunted by condenser 52.

The low potential side of the resonant circuit 50 is connected to the +B terminal of the direct current source, and is, also, suitably bypassed to ground for I. F. currents. Circuit 50 is tuned to the operating I. F. value of 4.3 mc. and it is desired that the circuit should include sufficient damping to give suitable width of pass band to the discriminator network.

The over-all selectivity characteristic of the I. F. amplifier network from the plate 24 to the grid 43 is represented by the dashed line curve shown in Fig. 2. The mid-band frequency of the over-all I. F. resonance curve is 4.3 mc., and the pass band of the entire I. F. network is in excess of 150 kc. It is pointed out that the tuned circuits 25 and 38 with the tuning staggered will provide very nearly the same shape of resonance curve as if the circuits were directly coupled together. As a matter of fact, they provide substantially more gain per tube than under-coupled circuits, and approximately 40% more gain per tube than critically coupled circuits. In addition, it is pointed out that almost any shape of resonance curve which is desired can be secured by utilizing stagger-tuned circuits in cascade, each of the tuned circuits have the right tuning and selectivity.

In order to accommodate the maximum modulation deviations of the FM signals applied to the FM detector network, it is preferred that the discriminator input network of the detector have a band pass characteristic about 25 to 50 kc. wider than in usual practice. In this connection it is pointed out that the discriminator input network of the FM detector circuit is generally constructed so that its sloping filter characteristic has its spaced response peaks substantially in excess of the maximum frequency deviations in the signal applied to the discriminator network. In the present case it is desirable to have the response peaks of the detection characteristic some 25 to 50 kc. beyond the usually widely spaced response peaks. For example, where the frequency spacing between the response peaks of the detection characteristic is normally about 200 kc., in accordance with my present invention I prefer to have the response peaks spaced about 225 to 250 kc. This excessive frequency spacing insures that the discriminator network will be able to handle the maximum shifting of the individual resonance peaks of curves 30 and 42 of Fig. 2.

The FM detector circuit may be of any suitable and well known form. I have illustrated in Fig. 1 an FM detector circuit of the so-called Conrad type. In this type of detector circuit the opposed rectifiers 53 and 54 are illustratively shown as diodes whose cathodes are connected by the series-arranged load resistors 55 and 56. Each of the load resistors is bypassed for I. F. components. The cathode end of resistor 56 is grounded. The anode 57 of rectifier 53 is connected to one side of the resonant input circuit 58, while the opposite side of the latter circuit is connected to the junction of load resistors 55 and 56. The anode 59 of diode rectifier 54 is connected to one side of the second resonant input circuit 60, and the opposite side of the latter circuit is also connected to the junction of resistors 55 and 56. Both of the resonant input circuits 58 and 60 are coupled to the primary circuit 50, but these circuits 58 and 60 are spaced apart in tuning so that a suitable detection characteristic is provided.

For example, the resonant input circuit 58 could be tuned 125 kc. below the frequency (4.3 mc.) of circuit 50, while input circuit 60 could be tuned 125 kc. above the operating I. F. value. In this way there is provided the Conrad type of discriminator input network which is well-known. Attention is directed to U. S. Patent No. 2,051,640, granted October 13, 1936, to F. Conrad for the details of such a discriminator input network. If desired, there may be used in place of the detector circuit shown a detection circuit of the type shown by S. W. Seeley in U. S. Patent No. 2,121,103, granted June 21, 1938. My present invention is in no way restricted by the specific construction of the FM detection circuit.

Audio frequency voltage is taken from the cathode end of resistor 55, while AVC voltage is derived from the junction of resistors 55 and 56. These respective points of voltage derivation are used, because there is derived from the cathode end of resistor 55 the differential rectified voltage which is representative of the modulation deviations of the received signals, while from the junction of resistors 55 and 56 there is derived a voltage which is always negative with respect to ground and whose magnitude depends upon the carrier amplitude variation.

The audio frequency signal voltage may be utilized in any desired manner, as by amplifying in one or more stages of audio frequency amplification followed by a reproducer. The AVC voltage is utilized by connecting the lead 46 to the junction of resistors 55 and 56. The AVC circuit is so designated, and it includes a suitable filtering resistor 60 for removing any alternating current components. It will now be seen that the AVC voltage, or bias, is applied through respective connections 21, 36 and 47 to the respective signal grids 16, 31 and 43.

The signal grids 31 and 43 have applied to them the full AVC bias developed at the output of the detector circuit. However, by virtue of the resistor 22 and the intermediate tap 23 thereof the grid 16 has only a portion of the AVC bias applied thereto. The magnitude of the AVC bias to be applied to signal grid 16 will depend upon several different factors. In order to explain the advantages secured by the novel features of my invention as shown in Fig. 1, it is pointed out that the grid to cathode input capacity of each of I. F. amplifier tubes 32 and 44 decreases as the applied AVC voltage increases in a negative polarity sense. In other words, in FM receivers heretofore using AVC in order to overcome, or compensate for, slow carrier amplitude variation there has been a problem of changes in selectivity characteristic caused by the changes in value of AVC voltage. As is well known, the negative AVC voltage changes the magnitude of the input capacity of the amplifier tube whose gain is under control. These changes in selectivity characteristic with signal strength are undesirable, and this is the problem which the present invention seeks to solve.

In accordance with my present invention the I. F. amplifier network uses staggered tuned circuits 25 and 38 so that the decrease in input capacity of the I. F. amplifier tubes 32 and 44 as the AVC voltage increases in magnitude will shift the overall band-pass characteristic 53 to a higher frequency. That is to say, the effect of decrease in the input capacity of each of the I. F. amplifier tubes is concurrently to shift the resonance peaks of curves 30 and 42. In order to keep the I. F. signal energy centered in the overall I. F. resonance characteristic the AVC voltage is additionally applied to the signal grid 16 of the converter tube. By making the grid 16 more negative, more electrons are forced to remain in the space charge area or zone near the oscillator grid 11. This has the effect of increasing the capacity across the oscillator tank circuit 8. For this reason the oscillator frequency decreases as the AVC bias applied to grid 16 increases. This produces a corresponding shift in the intermediate frequency.

It will now be appreciated that with the oscillator frequency below the signal frequency, an increase in the AVC voltage applied to grid 16 and consequent decrease in the oscillator frequency increases the frequency difference, or I. F. value, between signal frequency and oscillator frequency. Since the peak frequencies of resonance curves 30 and 42 increase as the negative AVC bias increases, the effect is to cause the center frequency of the I. F. signal energy produced across resonant circuit 25 to remain substantially centered on the overall resonance curve 53 of the I. F. amplifier network. Thus the detuning effect of the AVC is compensated for, and the discriminator network is presented with signal energy which is properly centered on the effective I. F. selectivity characteristic at the detector input terminals.

In general, by choosing a suitable amount of AVC voltage applied to grid 16 and by properly choosing the L/C ratios of the I. F. and oscillator circuits, compensation can be secured for a narrow range of tuning such as exists in the present FM band. Because the changes due to AVC are compensated a higher L/C ratio can be be used, and thus increased gain is secured. Usually a part of the total AVC voltage is sufficient to secure the desired frequency shift in the I. F. energy produced by the converter tube 3. The tap 23 on resistor 22 is a simple way to adjust the circuit for compensation. The value of negative AVC bias required to be applied to signal grid 16 of the converter tube to effect compensation, as stated before, depends on several different factors. These factors include; the amount that the I. F. resonant circuits shift in frequency upon variations of the AVC potentials, the L/C ratio of the oscillator tank circuit 8, and the characteristics of the tube used for the converter. Since the oscillator is operating at a much higher frequency than the I. F. value, the oscillator frequency need be changed by a much smaller percentage to secure the same number of cycles change as the I. F. The I. F. amplifier tube input capacity may change as much as 2.5 micromicrofarads (mmf.). If the tuned circuit capacity is 50 mmf., then there would be provided a change of capacity of 5%, corresponding to about 2.5% in frequency, or more than 100 kc. at 4.3 mc. The heterodyne oscillator, being approximately ten times as high in frequency, would have to be shifted 0.25% in frequency to compensate. It will be seen that this is 0.25 mmf. in 50 mmf., assuming that the oscillator tuned circuit capacity is also of the order of 50 mmf. which is readily secured.

Figure 4:
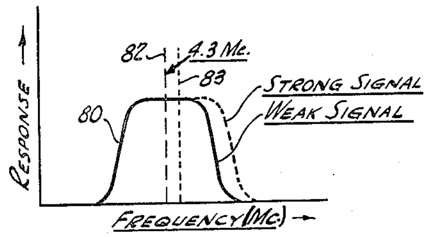
Fig. 4 illustrates graphically the action of the receiver system of Fig. 3.

In Fig. 3 I have shown a system utilizing the general method of AVC compensation disclosed in Fig. 1. However, the specific use of the method is different. In the FM receiver system of Fig. 3 it is desired to provide an I. F. amplifier 70, shown schematically represented, the frequency response of which will broaden with strong signal reception and without changes in tracking or tuning dial calibration. As shown in Fig. 4, which depicts the response curve 80 of the I. F. selector circuits 72 and 73 in Fig. 3, it is desired to increase the width of the curve to the dotted curve in response to strong signal reception. At the same time the bias of the converter signal grid 16 is controlled by the AVC circuit so as to cause the I. F. signals in the output circuit 72 properly to be centered in frequency at the mid-band frequency 83 of the widened response curve 81. In other words, I provide in Fig. 3 a form of automatic selectivity control with concurrent shift in I. F. value to substantially the mid-band frequency of the effective I. F. response curve.

The receiver system may be the same as that shown in Fig. 1, except for the construction of the I. F. amplifier network between converter plate 24 and the input terminals of FM detector 76. The converter tube 3 is shown as having its signal selector circuit 2 tuned by a variable condenser, instead of by a variable inductance. Further, the circuit 2 is adapted for coupling to a prior selective radio frequency amplifier. The signal selector mechanism 14 concurrently adjusts the variable tuning condensers of the signal selector circuit 2 and local oscillator circuit 8 respectively.

The I. F. amplifier 70 may be coupled at its output terminals to any suitable FM detector 76. The detectors of the aforesaid Conrad or Seeley patents may be employed. In either case, the detection characteristic preferably has spaced response peaks whose frequency separation is in excess of the expanded width of the I. F. response curve 81. The AVC voltage is applied over AVC lead 46 to the filter resistor 35 whose upper end is connected to the low potential side of the input circuit 73 of the I. F. amplifier tube, the latter being schematically represented by rectangle 70.

The I. F. selective network comprises the transformer 71 whose primary and secondary circuits 72 and 73 are each resonated to the operating I. F. value of 4.3 mc. for the case of weak signal reception. The parallel resonant circuits 72 and 73 are magnetically coupled to provide the band-pass response curve 80. The resistors 74 and 75 are individually shunted across the respective circuits 72 and 73, and they provide suitable damping to secure a wide band-pass curve with a substantially flat top. Reference is made to U. S. Patent No. 2,185,879, granted January 2, 1940, to H. C. Allen, for an I. F. network (see Fig. 6 of the patent) whose characteristics may be employed in my system of Fig. 3.

It is explained in the Allen patent that by suitable choice of the magnitude of resistors 74 and 75 the flat top of the I. F. selectivity curve 80 remains the same despite detuning of the secondary circuit 73 due to variations in input capacitance of amplifier 70 caused by changes in applied AVC bias. The curve 80 becomes somewhat broader, as depicted by dotted curve 81, as the AVC bias increases due to signal strength increase. The normal mid-band frequency 82, Fig. 4, of 4.3 mc., therefore, shifts to a higher value 83. Such broadening is desirable in FM reception, because it insures good quality during strong signal reception. At the same time the I. F. band width during weak signal reception is not unduly restricted. The upward shift in mid-band frequency upon reception of strong signals is, however, undesirable, because the I. F. signal will not be centered on the mid-band frequency of the widened response curve 83 but will still fall on line 82.

According to my invention, therefore, the AVC bias is applied to signal grid 16 by lead 21. The amount of required shift of the I. F. value is secured by using about half the AVC voltage across resistor 22. The tap 23 on resistor 22 is set so that the bias of grid 16 will be increased to such a magnitude that the oscillator frequency will be suitably decreased. The oscillator frequency will be decreased sufficiently to cause the I. F. value to be shifted to the frequency position indicated by the dotted vertical line 83 in Fig. 4. Here, again, the magnitude of AVC bias to be applied to grid 16 from the AVC line 46, 21 will depend on various factors, some of which are set forth above, which the set designer is accustomed to deal with.

It is believed that those skilled in the art of radio communication will readily be able to choose the constants for securing the desired compensation of frequency shift by applying a part of the AVC voltage to the converter grid 16 so that the oscillator frequency tends to shift from normal in a direction such as to keep the I. F. signal centered at the middle of the effective I. F. selectivity characteristic. The radio frequency circuit and the tuning dial calibration should not shift in this way. The discriminator balance may be off somewhat for strong signals, but there will be little noise to require balance under these conditions. It is stressed that the discriminator should be wide enough to handle the produced I. F. response.

By proper design the effects disclosed in Figs. 3 and 4 may be secured in the broadcast and television ranges. It will now be seen that both systems of Figs. 1 and 3 have a common generic method. In both cases the AVC bias causes the normal mid-band frequency to increase in accordance with increase in signal strength. However, the increase in AVC bias is caused to vary the bias on the signal grid of the converter tube to an extent such as to cause the local oscillator frequency to decrease sufficiently to provide an increase of the center frequency of the I. F. signals such that the center frequency falls substantially at the new mid-band frequency of the I. F. selectivity characteristic. While in Fig. 1 the I. F. selectivity characteristic is of the band-pass type and it is shifted as a whole in the frequency spectrum with increase of AVC bias, in Fig. 3 the effective width of the I. F. selectivity characteristic is broadened in accordance with AVC bias increase. Yet, in both systems the I. F. signal energy is properly centered in the I. F. selectivity curve by virtue of the same AVC bias which caused undesirable shift in the mid-band frequency of the I. F. response curve.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a frequency modulation superheterodyne receiver which is provided with a converter tube having a local oscillator network associated therewith, means for applying received frequency modulation signals to a signal control electrode of the converter tube, an intermediate frequency amplifier network comprising an electronic tube and at least two resonance circuits which are staggered in tuning by equal amounts with respect to an operating intermediate frequency value, means for deriving from intermediate frequency signals a control voltage whose magnitude is dependent upon the received signal carrier amplitude, means responsive to said control voltage for controlling the gain of said electronic tube, thereby incidentally shifting the peak frequencies of said resonance circuits to new values and shifting the operating intermediate frequency, and means responsive to said control voltage connected to said signal control electrode of the converter tube for causing the oscillator frequency to decrease sufficiently thereby to produce intermediate frequency signals whose center frequency is centered at the shifted operating intermediate frequency.

2. In combination with a converter tube having a signal input grid, a local oscillator section and an intermediate frequency output network, said output network comprising a pair of coupled resonant circuits suitably dampened to provide a band-pass curve with a flat top, an intermediate frequency amplifier tube having its input capacitance effectively across the second resonant circuit of said last mentioned pair of circuits, means for producing automatic control voltage from the intermediate frequency signals, means for applying the automatic control voltage to the input electrode of said intermediate frequency amplifier whereby the band-pass response at intermediate frequency is broadened and the mid-band frequency is substantially shifted in an increasing sense, and additional means including a voltage divider network connected for applying a portion of the control voltage to the signal input grid of said converter tube, said voltage divider network being so proportioned to increase the negative bias of the converter signal grid thereby to cause the local oscillator frequency to decrease to a sufficient extent to produce an increase in the intermediate frequency thereby to compensate for an increase of the mid-band frequency of the intermediate frequency response characteristic.

3. In a superheterodyne receiver of the type adapted to receive frequency modulation signals and whose intermediate frequency amplifier network has an electronic tube with input electrodes and has an effective band-pass response characteristic, means producing automatic volume control bias in response to signal carrier amplitude variation, means applying the volume control bias to said input electrodes to control the receiver gain, this application of control bias thereby producing additional undesired change in the mid-band frequency of the band-pass response of said intermediate frequency amplifier network, and means concurrently shifting the center frequency of the intermediate frequency signals in response to the automatic volume control bias to substantially the changed midband frequency of the said band-pass response.

4. In a superheterodyne receiver which is provided with a converter tube having a local oscillator network associated therewith, means for applying received signals to a signal control electrode of the converter tube, an intermediate frequency amplifier network comprising an electronic tube and at least two resonant circuits which are staggered in tuning by equal amounts with respect to an operating intermediate frequency value, means for deriving a control voltage from intermediate frequency signals whose magnitude is dependent upon the received signal carrier amplitude, means responsive to said control voltage for controlling the gain of the electronic tube, thereby incidentally shifting the peak frequencies of said resonant circuits to new values and shifting the operating intermediate frequency, and means, responsive to said control voltage, connected to said signal control electrode of the converter tube for causing the oscillator frequency to decrease sufficiently thereby to produce intermediate frequency signals whose center frequency is centered at the shifted operating intermediate frequency.

5. In a superheterodyne receiver of the type adapted to receive radio signals and whose intermediate frequency network has an electronic tube with input electrodes and has an effective band-pass response characteristic, the method which includes producing control bias in response to signal carrier amplitude variation, applying the volume control bias to said input electrodes to control the receiver gain, this application of control voltage thereby producing additional undesired change in the midband frequency, and concurrently automatically causing the center frequency of the intermediate frequency signals to be shifted in response to the control bias to a frequency value which is substantially centered with the mid-band frequency of the effective intermediate frequency response curve.

6. In a superheterodyne receiver which is provided with a converter tube having a local oscillator network associated therewith, means for applying received radio signals to a signal control electrode of the converter tube, an intermediate frequency amplifier network comprising an electronic tube and at least two resonance circuits which are staggered in tuning by equal amounts with respect to an operating intermediate frequency value, means for providing a control voltage whose magnitude is dependent upon the received signal carrier amplitude, means responsive to said control voltage for controlling the elecronic tube gain, thereby incidentally shifting the peak frequencies of said resonance circuits to new values and shifting the operating intermediate frequency, and means, responsive to said control voltage, including a voltage divider network connected to said signal control electrode of the converter tube for causing the oscillator frequency to decrease sufficiently thereby to produce intermediate frequency signals whose center frequency is centered at the shifted operating intermediate frequency.

7. In combination with a converter tube having a signal input grid, a local oscillator section and an intermediate frequency output network normally having a predetermined midband frequency response characteristic, said output network comprising a pair of coupled resonant circuits, an intermediate frequency amplifier tube having its input capacitance effectively across the second resonant circuit of said last mentioned pair of circuits, means for producing control voltage from the intermediate frequency signals, means for applying the control voltage to the input electrode of said intermediate frequency amplifier thereby incidentally increasing the midband frequency response of said network, and additional means including a voltage divider network coupled to apply a portion of the control voltage to the converter signal grid to cause the local oscillator frequency to decrease to a sufficient extent to compensate for said increase of the mid-band frequency of the intermediate frequency response characteristic.

WINFIELD R. KOCH.

REFERENCES CITED

The following references are of record in the file of this patent:

UNITED STATES PATENTS

| Number | Name | Date |
|---|---|---|
| 1,813,488 | Field | July 7, 1931 |
| 1,945,096 | Tellegen | Jan. 30, 1934 |
| 2,039,615 | Travis | May 5, 1936 |
| 2,051,898 | Van Roberts | Aug. 25, 1936 |
| 2,072,964 | Roberts | Mar. 9, 1937 |
| 2,148,633 | MacDonald | Feb. 28, 1939 |
| 2,206,181 | Gilbert | July 2, 1940 |
| 2,231,368 | Mountjoy | Feb. 11, 1941 |
| 2,263,825 | Loughren | Nov. 25, 1941 |
| 2,278,030 | Weber | Mar. 31, 1942 |

OTHER REFERENCES

RCA Report LB–233: Notes on the 2A7 and 6A7 converter tubes, February 2, 1934.